No. 779,767. PATENTED JAN. 10, 1905.
W., C. H. & R. A. CASWELL.
BELT GUIDE.
APPLICATION FILED JULY 12, 1904.
3 SHEETS—SHEET 3.
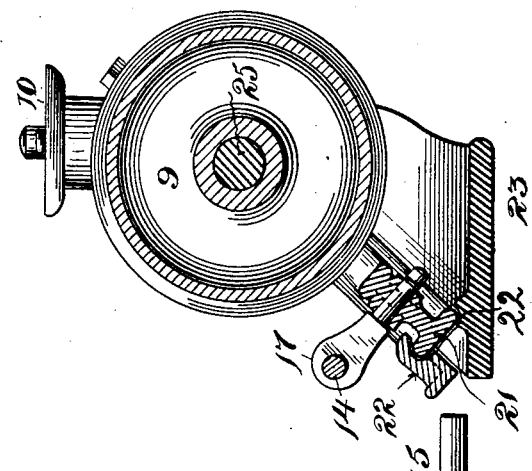
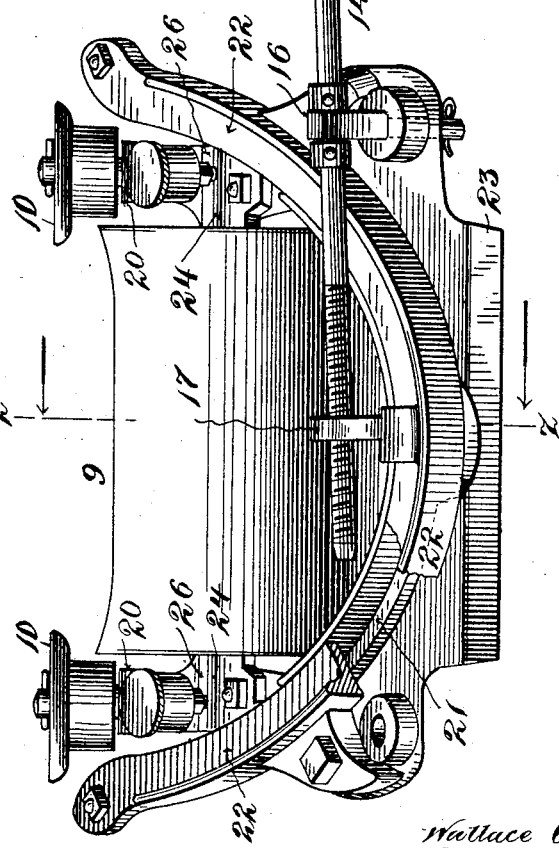
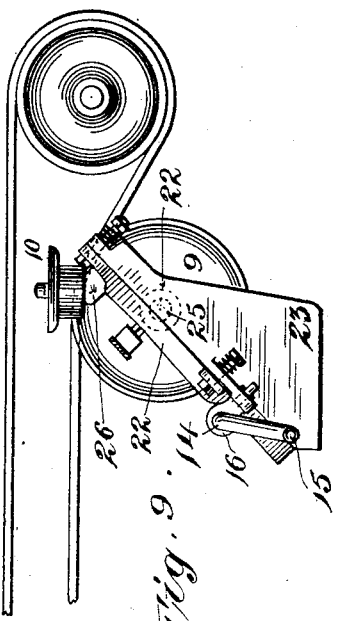
Witnesses
C. W. Benjamin
Chas. B. King
Wallace Caswell
Charles H. Caswell   Inventors.
Richard A. Caswell
By Their Attorney
Albert H. Walker No. 779,767. Patented January 10, 1905.

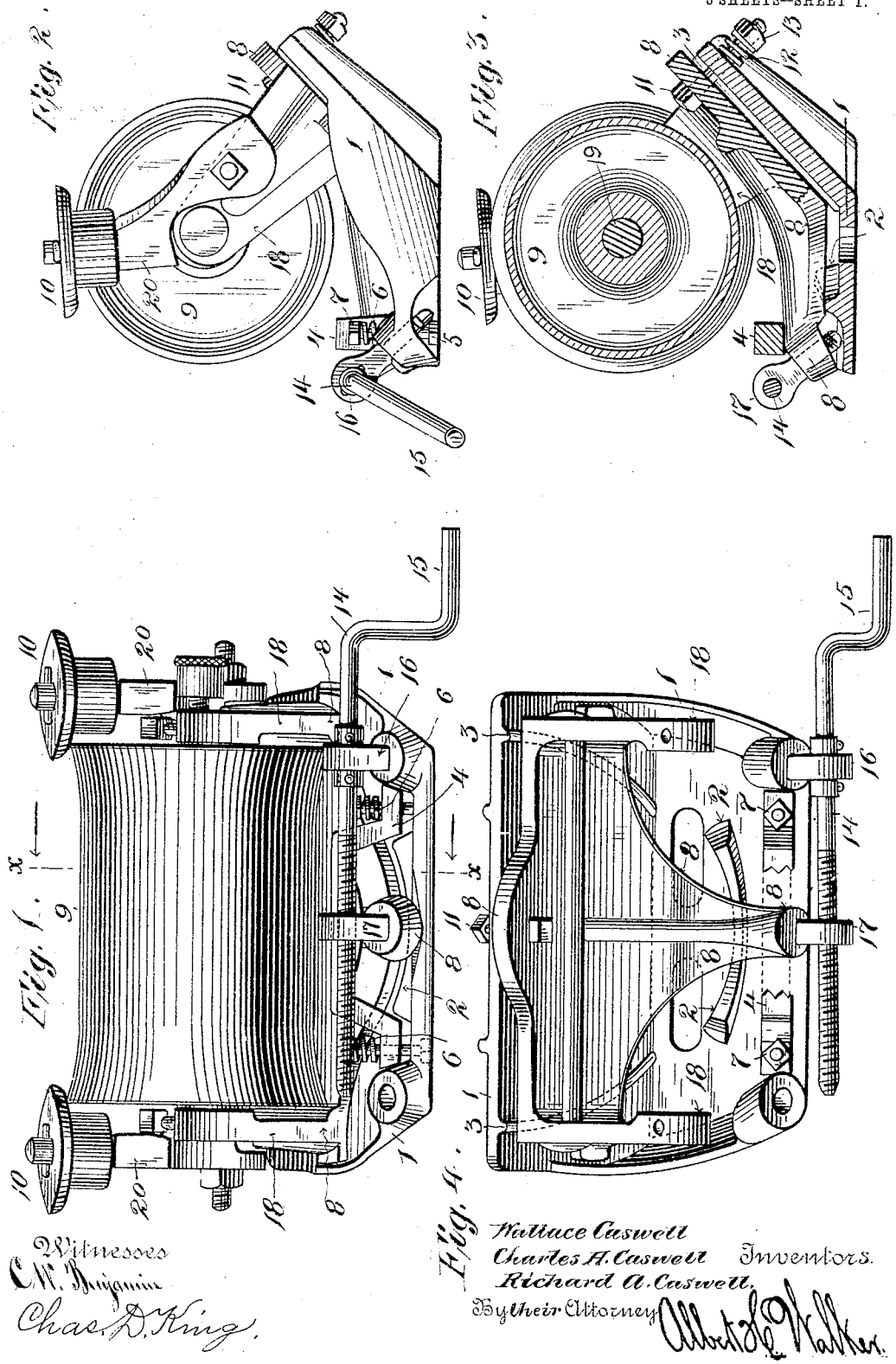

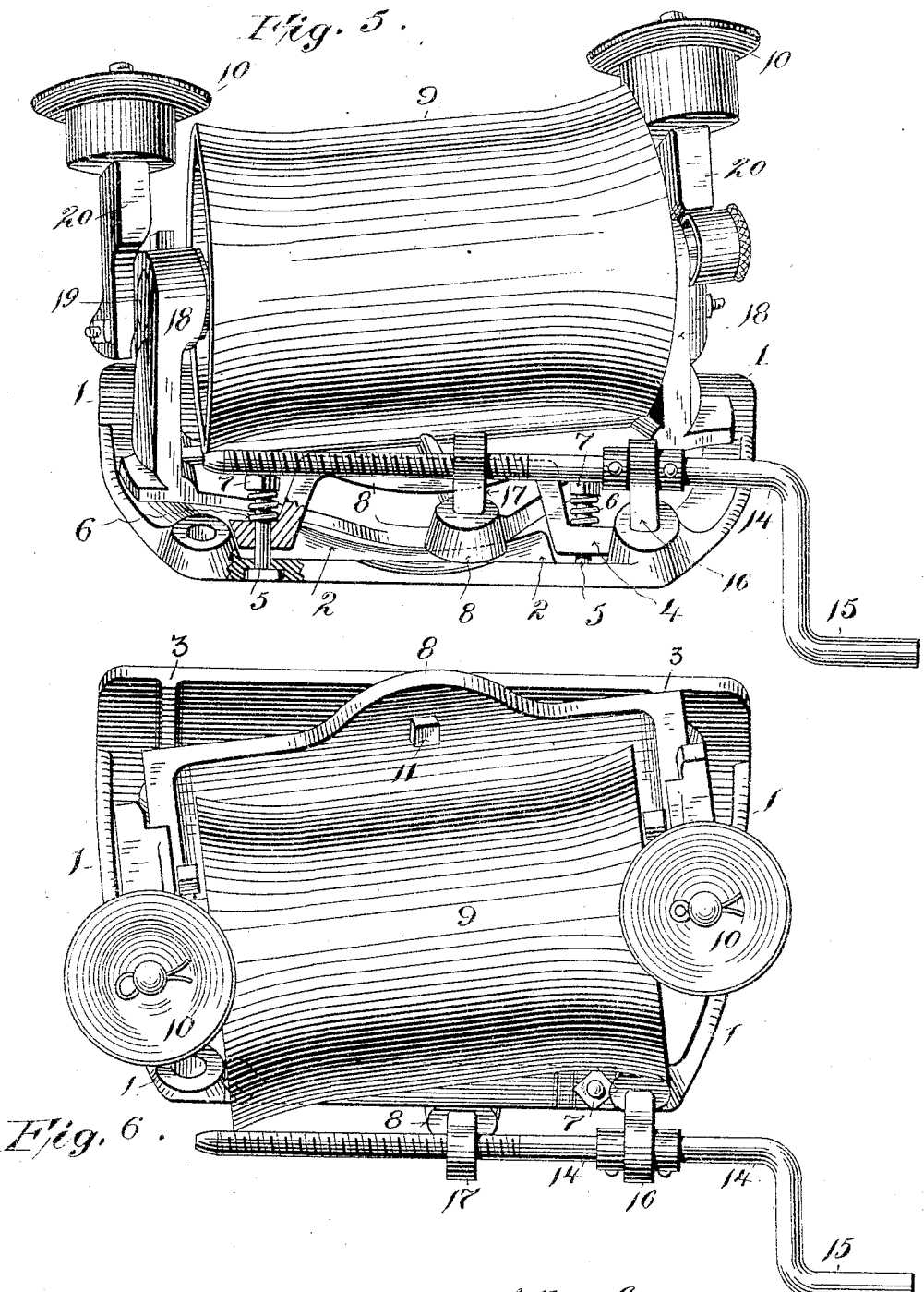

UNITED STATES PATENT OFFICE.

WALLACE CASWELL, CHARLES H. CASWELL, AND RICHARD A. CASWELL, OF CHEROKEE, IOWA.

BELT-GUIDE.

SPECIFICATION forming part of Letters Patent No. 779,767, dated January 10, 1905.

Application filed July 12, 1904. Serial No. 216,289.

*To all whom it may concern:*

Be it known that we, WALLACE CASWELL, CHARLES H. CASWELL, and RICHARD A. CASWELL, of Cherokee, Iowa, have invented certain new and useful Improvements in Belt-Guides, of which the following description and claims constitute the specification, which is illustrated by the accompanying three sheets of drawings.

Our invention is a mechanism to be placed preferably under, but possibly over, an endless belt between the driving-pulley and the driven pulley around which that belt is running, and preferably near to the driven pulley. The function of the mechanism is to guide the belt truly around the driven pulley, when and where in the absence of such mechanism the belt would be caused by some special tendency to run off one end or the other of the driven pulley. Such a special tendency exists where the axis of the driven pulley is out of parallelism with the axis of the driving-pulley or is not directly opposite thereto, and such a special tendency also exists where the axes of the driving-pulley and the driven pulley are both opposite and parallel, but where wind is blowing across the path of the belt and is tending to deflect the belt from the true path which it would otherwise take between the driving-pulley and the driven pulley.

Figure 1 of the accompanying drawings is a front view of one form of our invention. Fig. 2 is a view of the right-hand end of what is shown in Fig. 1. Fig. 3 is a sectional view on line $xx$ of Fig. 1. Fig. 4 is a plan view of what is shown in Fig. 1 minus the large concave roller and the two small flanged rollers shown in that figure. Fig. 5 is an enlarged front view substantially like Fig. 1 except in showing the movable parts of the mechanism in a different position. Fig. 6 is a plan view of what is shown in Fig. 5. Fig. 7 is a front view of another species of our invention. Fig. 8 is a sectional view on the line $zz$ of Fig. 7. Fig. 9 is a diagrammatic view showing the mechanism of Figs. 7 and 8 in position under an endless belt with a driven pulley to the right of the mechanism and with the left-hand part of the endless belt broken away and absent.

Referring now to Figs. 1 to 6, inclusive, the numeral 1 indicates the various parts to which it is applied of the integral stationary foundation-frame of the machine, that foundation-frame having a horizontal portion which is provided with the upwardly-extending curved concave rib 2, and also having an integral portion which extends diagonally upward at an angle of forty-five degrees from the rear edge of the horizontal portion and which is provided with the two curved ribs 3. A bracket 4 is adjustably attached to the forward border of the horizontal part of the foundation-frame 1 by means of the two bolts 5, each of which is surrounded by a spiral spring 6 and provided with a nut 7 above that spiral spring. The numeral 8 indicates the various parts to which it is applied, of the swinging frame, which is supported by the foundation-frame and which supports the large concave roller 9 and the two small flanged rollers 10. The swinging frame 8 is pivoted to the inclined portion of the foundation-frame 1 by the bolt 11, which passes through both frames with its axis occupying a line at right angles to the inclined portion of the foundation-frame 1, and therefore at an angle of forty-five degrees from the horizontal portion of that frame, and which line if extended diagonally upward from the upper end of the pivotal bolt 11 would pass through the concave roller 9 nearer to its rearward than to its forward side and near to the axis of rotation of the roller. The bolt 11 is provided with a spring 12 below the diagonal portion of the foundation-frame 1 and with the nut 13 below that spring, which spring is kept under sufficient tension by which nut to hold the swinging frame 8 firmly down upon the ribs 3 of the diagonal portion of the foundation-frame 1. The swinging frame 8 not only has an inclined portion substantially parallel to the inclined portion of the foundation-frame 1, but also has a horizontal portion in the form of a horn which extends forward from its inclined portion and which rests upon the curved concave rib 2, and the forward end of which horn passes under the bracket 4, and which horn is held down upon the concave rib 2 by means of the springs 6, which surround the bolts 5, respectively, and which are kept in tension between the nut 7 and the ends of the bracket 4.

The screw-rod 14 is provided with a crank 15 and is mounted in a bearing in the bracket 16, which bracket is pivotally mounted in a bearing in the foundation-frame 1. The screw-rod works in a threaded bearing in the bracket 17, and that bracket is pivotally mounted in a bearing in the forward end of the horizontal horn of the swinging frame 8. The two brackets 18 extend diagonally upward from the inclined part of the swinging frame 8, and the upper ends of those brackets support the ends of the fixed rod 19, which constitutes the axis of rotation of the concave roller 9. The two brackets 20 are adjustably bolted to the two brackets 18, respectively, and extend upward therefrom and are provided at their upper ends with bearings for the small flanged rollers 10.

The mode of operation of the mechanism of the Figs. 1 to 6, inclusive, is as follows: That mechanism being placed in a position relatively to an endless belt and a driven pulley, such as that occupied in Fig. 9 by the mechanism of the Figs. 7 and 8, it is operative merely as a belt-tightener when the axis of rotation of the concave roller 9 is parallel to and is also opposite to the axis of the driven pulley and when no wind or other extraneous force is exerting any tendency to deflect the belt from a direct path between the driving-pulley and the driven pulley. When the axis of the driving-pulley and the axis of the driven pulley are not parallel to each other, the mechanism of Figs. 1 to 6, inclusive, of the drawings is operative to guide the belt truly around the driven pulley in the following manner: Assuming that the axes of the driving-pulley and of the driven pulley are nearer together at those of their ends which are on the same side of the belt as is the crank 15 than those axes are at their opposite ends, that deviation from parallelism, if uncorrected, would tend to cause the belt to run off the driven pulley at that end of the latter which is nearest the crank; but that tendency is corrected with our mechanism of Figs. 1 to 6, inclusive, by turning the crank 15 in a clockwise direction a larger or smaller number of revolutions, according to the extent of the deviation to be corrected. That turning of the crank 15 operates, through the right-handed screw on the screw-rod and through the bracket 17, which is pivoted to the horn of the swinging frame 8, to draw the end of that horn toward the crank end of the screw-rod and diagonally upward upon the concave rib 2. That movement of the horn of the swinging frame causes that frame to swing upon the pivot 11, by which it is attached to the inclined portion of the foundation-frame 1. That swinging of the frame 8 causes a compound movement of the axis of rotation of the concave roller 9. That compound movement consists in raising that end of that axis which is nearest to the crank 15 and in lowering the opposite end of that axis, as shown in Fig. 5 and consists also in carrying that end of that axis which is nearest to the crank 15 nearer to the axis of the driven pulley and in carrying the opposite end of that axis away from the axis of the driven pulley, as indicated in Fig. 6. The first element in this compound movement tends to take up the slack of that side of the belt which is nearest to those ends of the axes of the driving-pulley and of the driven pulley which are on the same side of the belt as is the crank 15 and which slack results from the fact that those ends of those axes are nearer together than are their opposite ends, while the second element of this compound movement by throwing the axis of the concave roller 9 out of parallelism with the driven pulley tends to direct the belt toward that end of the driven pulley which is most remote from the driving-pulley. This latter tendency is due to the frictional contact of the periphery of the concave roller 9 with the belt and which frictional contact being diagonal to the path of the belt tends to cause the belt to run diagonally forward in a direction opposite to that tendency to run diagonally forward which in the absence of our mechanism would be due to the want of parallelism between the axes of the driving-pulley and of the driven pulley.

The belt is subject to the control and guidance of the concave roller 9 by reason of frictional contact between the periphery of that roller and the belt and also by reason of the fact that the periphery of that roller is concave. It is not always necessary to supplement these means of control of the belt by the employment of the small flanged rollers 10, and those rollers are, indeed, merely guard-rollers, such as have been used for many years on opposite sides of running belts. The concave roller 9 may be made cylindrical instead of being made concave with fair results in some cases; but if so made the flanged guard-rollers, if furnished to the machine, will be more frequently called upon to operate than if the roller 9 is concave, unless the cylindrical roller is provided with end flanges of its own, which it may properly be.

It is known that a driving-pulley and a driven pulley which are running together with an endless belt passing around both of them should have convex peripheries rather than concave peripheries, although that fact may seem paradoxical. Those who know that fact are apt to infer therefrom that any guide-roller running between a driving-pulley and a driven pulley must likewise have a convex rather than a concave periphery; but that opinion is erroneous, for it is a fact that such a guide-roller should be either cylindrical or concave and that it should be concave rather than cylindrical.

The modified mechanism in Figs. 7, 8, and 9 of the drawings differs from that shown in Figs. 1 to 6, inclusive, in construction, but not in essential mode of operation. That difference of construction consists mainly in the fact that the same swinging motion of the axis of rotation of roller 9, which in the mechanism of Figs. 1 to 6, inclusive, is accomplished by means of the pivoted swinging frame 8, is accomplished in the mechanism of Figs. 7, 8, and 9 by means of the unpivoted segmental swinging frame 21, which moves in the segmental raceway 22 in the foundation-frame 23, and which segmental raceway being inclined at an angle of forty-five degrees from the horizontal base of the foundation-frame causes the segmental swinging frame to carry the axis of the roller 9 through the same compound movement as that which in the mechanism of Figs. 1 to 6, inclusive, results from the frame 8 swinging on its inclined pivot 11. The upper ends of the segmental swinging frame 21 support the bearings 24 for the ends of the revolving axis 25 of the concave roller 9 of that mechanism, and the brackets 26 extend upward from the upper extremities of the segmental swinging frame 21 and are provided at their upper ends with bearings for the flanged rollers 10, respectively.

We understand that the particular mechanism shown in Figs. 1 to 6, inclusive, of the drawings and the particular other mechanism shown in Figs. 7, 8, and 9 of the drawings constitute two species of the same genus of invention, and we believe that we are entitled in this patent to a generic claim covering both those species and also covering any other species of the same invention to which the terms of that generic claim are applicable. Therefore we do not intend to limit our right to our invention to either of the two species of our belt-guides shown in the accompanying drawings, though those are the species which we have made and sold in considerable numbers since about the beginning of 1903 and which have since been used with entire efficiency by the purchasers thereof.

In the accompanying drawings the swinging pivoted frame 8 and also the segmental swinging frame 21 are shown as swung by means of a screw-rod 14, turned by a crank 15, operating upon the brackets 16 and 17, and that is a good mechanism for producing that swinging; but any one of several other mechanisms can be substituted for that mechanism to be the primary means of imparting to the axis of rotation of the roller 9 that compound motion of oscillation which we have described.

In the accompanying drawings the axis of rotation of the roller 9 is shown as having a compound oscillation, both elements of which are equal in extent. This equality results from the fact that the pivotal bolt 11 of the mechanism of Figs. 1 to 6, inclusive, is at an angle of forty-five degrees from the horizontal diameter of the roller 9 and also at an angle of forty-five degrees from the vertical diameter of that roller and from the fact that the same inclination of forty-five degrees from each of those diameters characterizes the swinging segmental frame 21 of the mechanism of Figs. 7, 8, and 9. That particular angle is a good one to be employed in every species of our mechanism; but our experience with that mechanism appears to indicate that an angle of about fifty-five degrees from the horizontal and an angle of about thirty-five degrees from the vertical diameter of the roller 9 may be even better than an angle of forty-five degrees from each of those diameters.

It is necessary in order to give our mechanism its highest utility to firmly hold in its adjusted position the pivoted swinging frame 8 or the segmental swinging frame 21 or any other swinging frame that may be substituted for either whenever the roller 9 is running at a high speed. For this purpose we employ the spiral springs 6 and the spiral spring 12 in the mechanism of Figs. 1 to 6, inclusive, and we employ corresponding springs in the mechanism of Figs. 7, 8, and 9, which springs while allowing the carriage to be swung from position to position operate by their tension to keep it located at any position to which it may be swung. So, also, if desired, a set-screw, a cam, a wedge, or a latch or other form of locking or fastening device may be used to firmly fix and hold the swinging frame in any desired position.

In the mechanism of Figs. 1 to 6, inclusive, the line occupied by the axis of the pivotal bolt 11 if extended diagonally upward from the upper end of that bolt would pass laterally through the roller 9 somewhat nearer to its rearward than to its forward side and near to its axis of revolution. This particular position of the axis of oscillation of the roller 9 also characterizes the mechanism of Figs. 7, 8, and 9 of the drawings, though in that mechanism that axis of oscillation is not also the axis of a pivot, but is an imaginary line concentric with the segmental swinging frame 21 and around which that segmental swinging frame oscillates at an unvarying distance. Whether this axis of oscillation is the axis of a pivot, as in the case of the mechanism of Figs. 1 to 6, inclusive, or is an imaginary geometrical line, as in the mechanism of Figs.

7, 8, and 9, its location and direction are matters of essential importance in our invention. In each species of our invention the line of that axis of oscillation must be such that if extended it would pass laterally through the roller 9 instead of passing either backward or forward thereof or above or below it or past one end or the other thereof. This necessity results from the fact that it is inconsistent with the mode of operation of our invention to impart any considerable endwise motion to the roller 9 when it is swung from position to position and from the fact that such endwise motion would result if the line of the axis of oscillation of the roller 9 when extended would pass by that roller instead of passing laterally through it.

While it is essential to our invention that the line of the axis of oscillation of the roller 9 must pass laterally through that roller, it is not indispensable that that axis of oscillation should be inclined to the vertical diameter of the roller nor that it should be inclined to the horizontal diameter of the roller, provided it passes laterally through the roller at or near its axis of revolution. The inclination of the axis of oscillation of the roller 9 midway between the vertical diameter and the horizontal diameter of that roller is so important to the full utility of our invention that we do not propose ourselves to manufacture specimens of our invention without such an inclination of the axis of oscillation of the roller 9; but inasmuch as our invention has some utility in some cases, where its roller 9 oscillates upon a horizontal axis or upon a vertical axis the line of which if extended would pass laterally through that roller at or near its axis of revolution, we believe that we are entitled to a generic claim broad enough to also cover such inferior constructions.

In speaking of the "vertical" diameter and of the "horizontal" diameter of the roller 9 we refer to the relations of such diameters to the path of the belt to be guided by that roller rather than their relations to the surface of the earth, though those relations will be nearly the same where the path of the belt is nearly parallel to the surface of the earth.

Our belt-guide is particularly useful as a fixture to a threshing-machine the threshing-cylinder of which is rotated at a high speed by a long, wide, and heavy endless belt running around a driven pulley which is keyed to the axis of that cylinder and also running around a driving-pulley which is appurtenant to a movable steam-engine located at a considerable distance from the threshing-machine.

Threshing-machines and the engines which run them must be frequently moved from place to place, and whenever they are located in a new position it is very difficult and very expensive of time to so locate them that the driving-pulley of the steam-engine and the driven pulley of the threshing-machine are exactly opposite to each other and also have their axes exactly parallel to each other, and, indeed, such a location is sometimes rendered impossible by the presence of obstructions; but in the absence of any belt-guide between the driving-pulley of the engine and the driven pulley of the threshing-machine any considerable deviation from parallelism or any considerable deviation from opposition between the axes of those rollers must result in the belt running off one end or the other of the driven pulley. To prevent this result, threshing men have sometimes set strong stakes into the ground on the opposite sides of the belt near the driven pulley; but whichever of those stakes operated to keep the belt on the driven pulley did so only by frictional contact with the edge of the belt, and that frictional contact was destructive of the belt itself.

The last advance upon such a crude belt-guide as would be furnished by two such vertical stakes or their equivalents, which, so far as we know, was made prior to our invention, consists in the belt tightener and guide which is shown and described in Letters Patent of the United States No. 665,132, granted January 1, 1901, to Charles H. Remick, of Dessell, Minnesota. Remick's apparatus consists, essentially, of a large horizontal roller adapted to be run under a belt near the driven pulley of a threshing-machine, together with two small rollers running on vertical axes adjacent to the ends of his horizontal roller; but Remick's large roller does not oscillate upon any axis the line of which if extended would pass laterally through that roller. Quite otherwise than this, it does oscillate upon an axis parallel to its axis of revolution and distant therefrom. Therefore the oscillation of Remick's large roller operates only to tighten the belt and does not operate to guide the belt. The guiding devices in Remick's apparatus are the small vertical rollers at the ends of his large horizontal roller, and those small vertical rollers operate to guide the belt in the same way that belts were previously guided by two upright stakes on the opposite sides thereof, except that in Remick's apparatus the obstacles which he interposes against an edgewise movement of the belt cause somewhat less injury to the edge of the belt than does an upright stake, simply because Remick provides each of the obstacles, which would otherwise operate substantially like an upright stake, with a roller to reduce the friction upon the edge of the belt.

The thing that guides the belt in our mechanism is the large roller 9, and that roller guides the belt because it has an axis of oscillation upon a line which if extended would pass laterally through the roller, and because the roller is adjustable at varying positions upon that axis of oscillation, and because that adjustability enables one end of the roller to be lifted while the other is lowered and enables one end of the roller to be carried nearer to the axis of the driven pulley of the threshing-machine while the other is carried farther from that axis, and because that compound oscillation of the axis of rotation of the roller enables it to be so fixed in position as to guide the belt in exactly the desired direction by means of its contact with the under side of the belt and without any assistance from stakes, rollers, or other obstacles impinging against either edge of the belt.

We claim as our joint invention—

1. A belt-guide, comprising a roller having an axis of rotation, and having also an axis of oscillation, and which axis of oscillation occupies a line which if extended would pass laterally through the roller, approximately at its axis of rotation; and comprising also an oscillating carriage to oscillate the roller, and a screw to oscillate the roller with the carriage.

2. A belt-guide, comprising a roller having an axis of rotation, and having also an axis of oscillation, and which axis of oscillation occupies a line which if extended would pass laterally through the roller in a direction inclined between its vertical diameter and its horizontal diameter; and comprising also a carriage to carry the roller, and a screw to oscillate the roller with the carriage.

3. A belt-guide, comprising a roller having an axis of rotation, and having also an axis of oscillation, and which axis of oscillation occupies a line which if extended would pass laterally through the roller, approximately at its axis of rotation; and comprising also an oscillating carriage, and a stationary base to support the carriage, and means to oscillate the carriage with the roller upon the stationary base.

4. A belt-guide, comprising a roller having an axis of rotation, and having also an axis of oscillation, and which axis of oscillation occupies a line which if extended would pass laterally through the roller in a direction inclined between its vertical diameter and its horizontal diameter; and comprising also an oscillating carriage, and a stationary base to support the carriage, and means to oscillate the carriage with the roller upon the stationary base.

5. A belt-guide, comprising a roller having a concave periphery, and having an axis of rotation, and having also an axis of oscillation, which axis of oscillation occupies a line which if extended would pass laterally through the roller approximately at its axis of rotation and comprising also an oscillating carriage, a stationary base to support the carriage, and means to oscillate the carriage with the roller upon the stationary base.

6. A belt-guide, comprising a roller having a concave periphery, and having an axis of rotation, and having also an axis of oscillation, and which axis of oscillation occupies a line which if extended would pass laterally through the roller, between its ends, and in a direction inclined between its vertical diameter and its horizontal diameter and comprising also an oscillating carriage, and a stationary base to support the carriage, and means to oscillate the carriage with the roller upon the stationary base.

7. A belt-guide, comprising a roller having an axis of rotation, and having also an axis of oscillation, and which axis of oscillation occupies a line which if extended would pass laterally through the roller, approximately at its axis of rotation; and comprising also an oscillating carriage, having points of bearing on a stationary base which are curved and concentric with the axis of oscillation of the roller; and comprising also a stationary base having corresponding points of bearing; and comprising also means to oscillate the carriage with the roller on that stationary base.

8. A belt-guide, comprising a stationary foundation-frame having a segmental curved raceway; and comprising also a segmental swinging frame oscillating on that raceway; and comprising also a roller having an axis of rotation on that swinging frame, and having an axis of oscillation with that swinging frame and comprising also means to oscillate the swinging frame with the roller, upon the stationary foundation-frame.

9. A belt-guide, comprising a stationary foundation-frame having a segmental curved raceway; and comprising also an inclined segmental swinging frame oscillating on that stationary frame; and comprising also a roller having an axis of rotation on that swinging frame, and having an axis of oscillation with that swinging frame and comprising also means to oscillate the swinging frame with the roller, upon the stationary foundation-frame.

10. In a belt-guide, a semicircular plate mounted to slide on its curved edge, and a roller journaled in said plate; and means to oscillate the semicircular plate with the roller, substantially as shown and described.

11. In a belt-guide, a semicircular plate set at an angle to the horizontal, and adapted to slide on its curved edge, and a roller journaled in said plate to bear against the face of the belt, and means to swing said plate so that the axis of said roller is at an angle to the horizontal; substantially as shown and described.

12. In a belt-guide, a curved guide suitably mounted, a semicircular plate mounted in said curved guide, a roller journaled in said plate, and means to swing said plate so that the axis of said roller is at an angle to the horizontal; substantially as shown and described.

13. In a belt-guide, a curved groove-guide suitably mounted, a semicircular plate mounted in said groove-guide, a roller journaled in said semicircular plate to bear against the face of the belt, and a screw-rod journaled in a swinging bracket and operating in a bracket pivoted on said semicircular plate for turning said semicircular plate at an angle; substantially as shown and described.

In testimony whereof each of us has hereto affixed his signature in the presence of two witnesses.

WALLACE CASWELL.
CHARLES H. CASWELL.
RICHARD A. CASWELL.

Witnesses for Wallace Caswell and Charles H. Caswell:
 HENRY C. ANDREWS,
 E. C. HERRICK.

Witnesses for Richard A. Caswell:
 A. J. COCHRAN,
 BERTA M. COCHRAN.